US012669101B2

(12) United States Patent
Dudar

(10) Patent No.: US 12,669,101 B2
(45) Date of Patent: Jun. 30, 2026

(54) METHOD AND SYSTEM FOR SEALING A FUEL FILLER NECK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 161 days.

(21) Appl. No.: 18/524,691

(22) Filed: Nov. 30, 2023

(65) Prior Publication Data

US 2025/0179978 A1 Jun. 5, 2025

(51) Int. Cl.
*F02M 25/08* (2006.01)

(52) U.S. Cl.
CPC ..... *F02M 25/0836* (2013.01); *F02M 25/0854* (2013.01)

(58) Field of Classification Search
CPC ........... F02M 25/0836; F02M 25/0854; F02M 25/0809
See application file for complete search history.

(56) References Cited

U.S. PATENT DOCUMENTS 10,344,879 B2 7/2019 Masaki
11,149,698 B2 10/2021 Dudar
2013/0019966 A1* 1/2013 Hawa ........................ F16K 1/22 137/511
2021/0370761 A1* 12/2021 Okazaki ................ B60K 15/04

FOREIGN PATENT DOCUMENTS

KR 102154268 B1 9/2020
KR 20220000100 A 1/2022
WO 2020164806 A1 8/2020
WO 2021260119 A1 12/2021

* cited by examiner

*Primary Examiner* — Long T Tran
*Assistant Examiner* — Charles J Brauch
(74) *Attorney, Agent, or Firm* — McCoy Russell LLP

(57) ABSTRACT

Methods and systems are presented for diagnosing operation of an evaporative emissions system. The methods and systems include two fuel filler neck valves to control flow of fuel and fuel vapors into and out of a fuel filler neck tube. The two fuel filler neck valves may be biased closed with return springs.

20 Claims, 7 Drawing Sheets

600

| | 620 | 622 | 624 |
|---|---|---|---|
| 602 | Vehicle state | Large filler neck valve (1st valve) | Small filler neck valve (2nd valve) |
| 604 | Off: fuel tank vented | Closed | Closed |
| 606 | Refueling | Open | Closed |
| 608 | ON: Purging | Open | Closed |
| 610 | Off - diagnostic: Pressure phase | Closed | Open |
| 612 | Off - diagnostic: Vacuum phase | Open | Closed |
| 614 | ON – warm fuel | Closed | Open |

FIG. 6

METHOD AND SYSTEM FOR SEALING A FUEL FILLER NECK

FIELD

The present description relates generally to methods and systems for sealing and venting a fuel filler neck of a fuel tank for a vehicle.

BACKGROUND/SUMMARY

A vehicle may include a fuel tank for storing liquid fuel. The vehicle's manufacturer may have to certify that the fuel tank and an evaporative emissions system of the vehicle meet applicable statutes. The fuel tank may be supplied with fuel via a fuel filler neck that extends from a fuel filler cup to the fuel tank. In order to comply with applicable statutes, integrity of the fuel tank and fuel filler neck may be verified. Further, the fuel system may include a recirculation tube or conduit that allows fuel vapors from the fuel tank to be recirculated from the fuel tank through the fuel filler neck and back to the fuel tank. The recirculation tube may reduce an amount of fuel vapor that is stored in a carbon canister during refilling of the fuel tank. Additionally, the recirculation tube may allow a path for fuel vapors to migrate when the fuel filler neck is below the fuel level in the fuel tank. However, the recirculation tube adds financial expense to the vehicle and it may be a potential source for fuel system breaches.

The inventor herein has recognized the above-mentioned issue and has developed a vehicle fuel system, comprising: a fuel tank; a fuel filler tube; a first valve positioned between the fuel tank and the fuel filler tube or along the fuel filler tube, the first valve opening to allow flow into the fuel tank and closing to prevent flow from the fuel tank; and a second valve positioned between the fuel tank and the fuel filler tube or along the fuel filler tube, the second valve opening to allow flow out of the fuel tank and closing to prevent flow out of the fuel filler tube.

By installing two valves along the length of a fuel filler tube or between the fuel filler tube and a fuel tank, it may be possible to provide the technical result of being able to remove a recirculation tube and determine a presence or absence of a breach of a fuel filler neck. Further, the two valves may prevent fuel from entering the fuel filler neck from the fuel tank, thereby reducing a possibility of fuel exiting the fuel tank via the fuel filler neck. In particular, one of the two valves may permit fuel flow from the fuel filler neck to the fuel tank and prevent fuel flow from the fuel tank to the fuel filler neck while the other of the two valves permits fuel vapors to enter the fuel filler neck tube so that a breach of the fuel filler neck tube may be detected.

The present description may provide several advantages. In particular, the approach may reduce financial expense of a vehicle evaporative emissions system. In addition, the approach may reduce a possibility of fuel exiting the fuel tank and entering a fuel filler neck tube. Further, the approach permits detection of a breach of a fuel filler neck tube.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

BRIEF DESCRIPTION OF THE DRAWINGS

FIG. 6 shows a table of valve positions for an evaporative emissions system.

DETAILED DESCRIPTION

Figure 4:
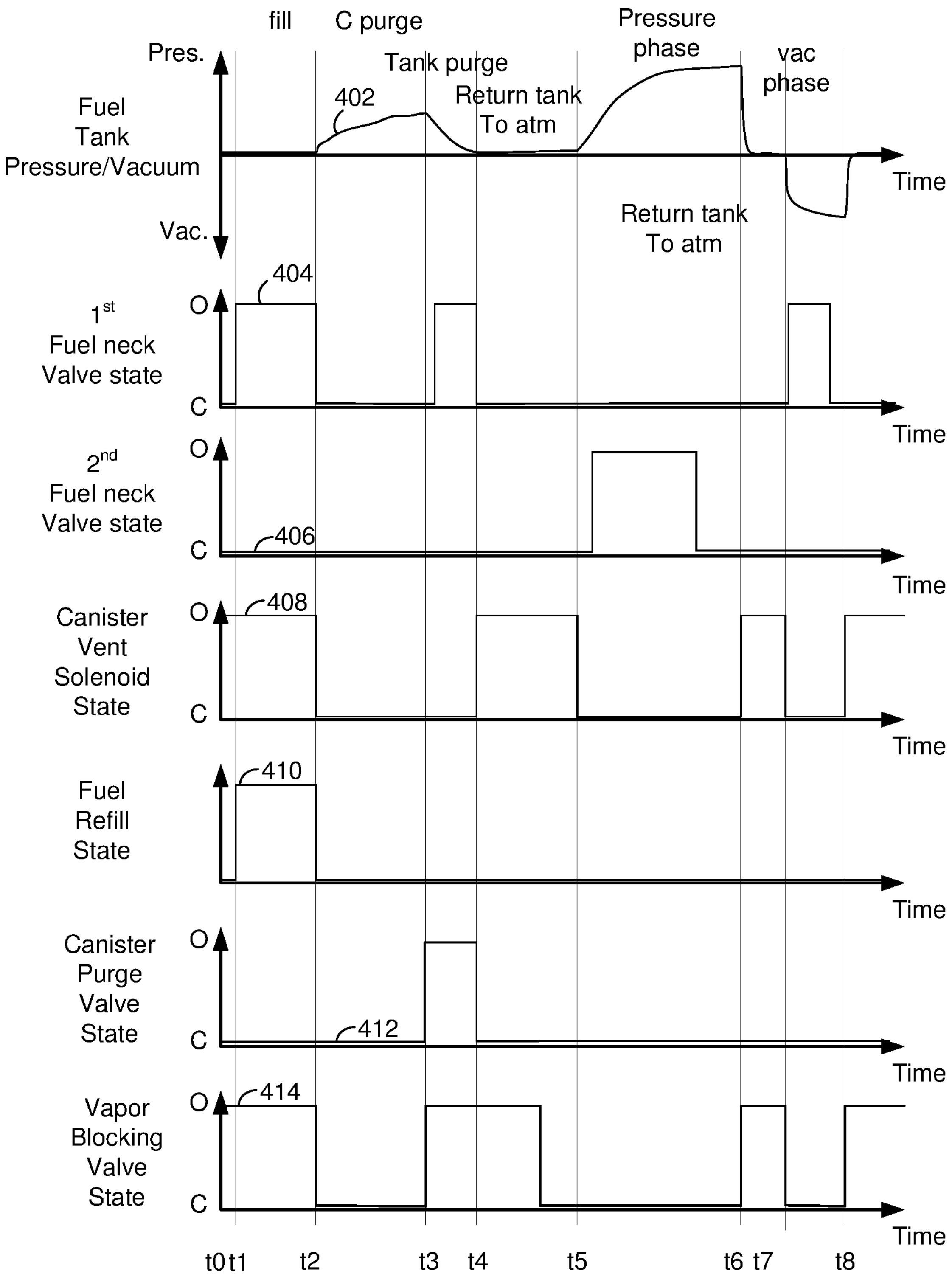
FIG. 4 shows an example vehicle operating sequence according to the method of FIG. 5.
Figure 5:
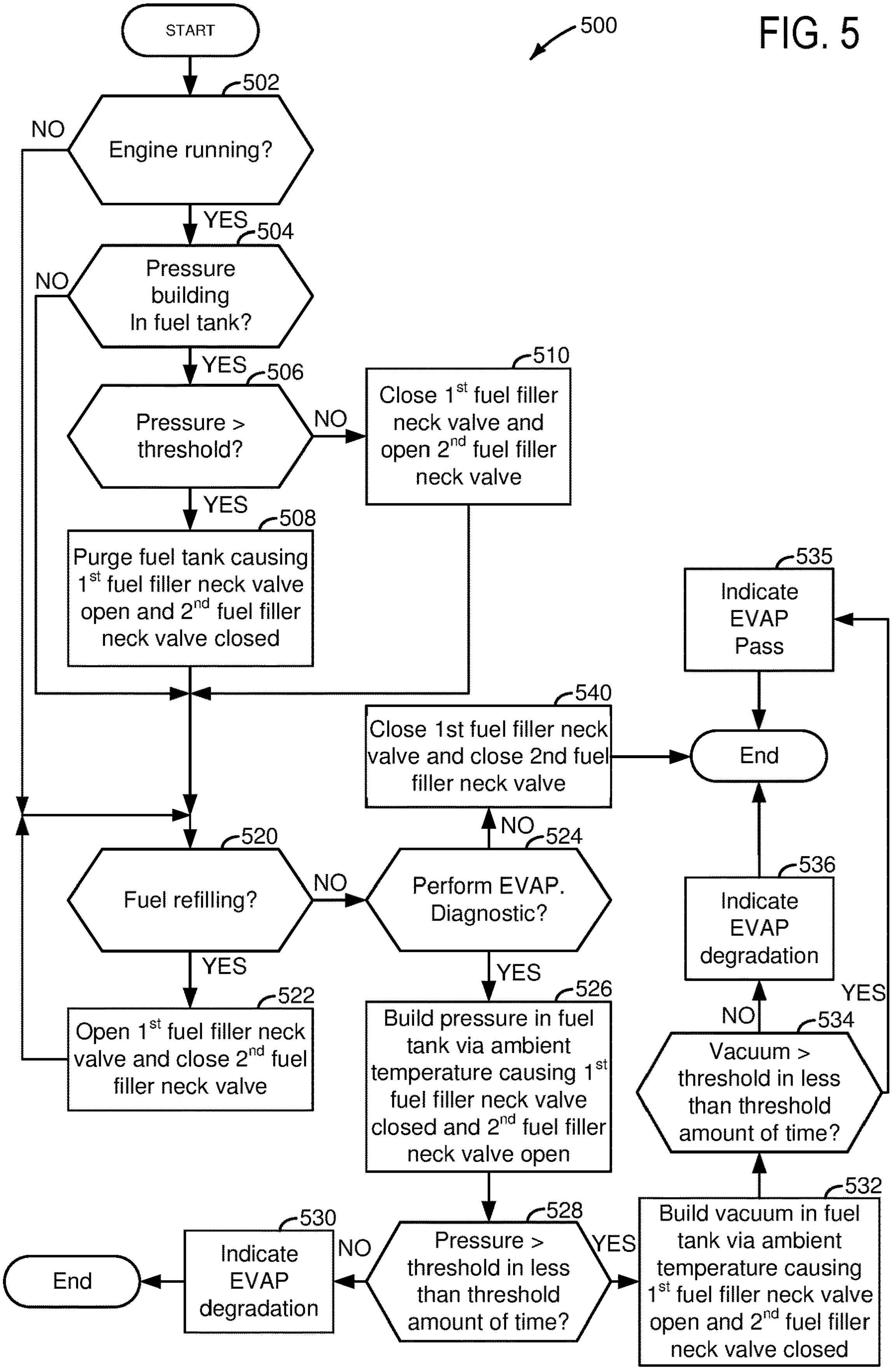
FIG. 5 shows a flowchart of an example method for an evaporative emissions system.

The following description relates to systems and methods for operating an evaporative emissions system of a vehicle. In one example, the evaporative emissions system may include two valves that open in different directions to control flow of fuel and fuel vapor into and out of a fuel filler neck tube or pipe. The two valves may be located along the fuel filler neck tube or pipe or between the fuel tank and the fuel filler neck tube or pipe. The evaporative emissions system may be coupled to an internal combustion engine of the type shown in FIG. 1. A first art evaporative emissions system is shown in FIG. 2A. An evaporative emissions system according to the present description is shown in FIG. 2B. Example valves incorporated into a single package are shown in FIGS. 3A-3D. A vehicle operating sequence illustrating operation of fuel filler neck valves is shown in FIG. 4. A flowchart of a method for operating a vehicle that includes fuel filler neck valves is shown in FIG. 5. A table including fuel filler neck valve states is shown in FIG. 6.

Figure 1:
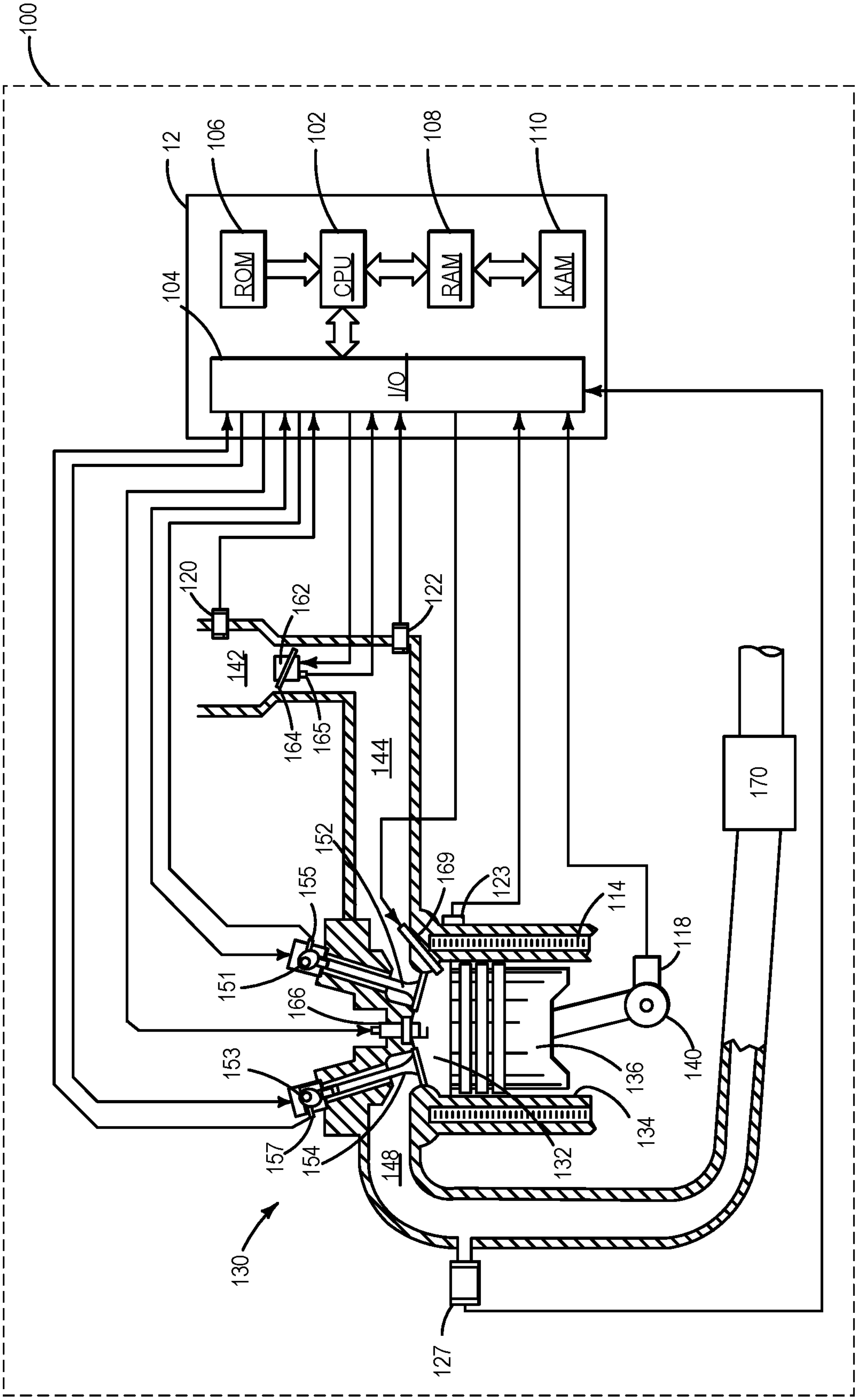
FIG. 1 shows an example engine that may be included in the systems and methods described herein.
Figure 2A:
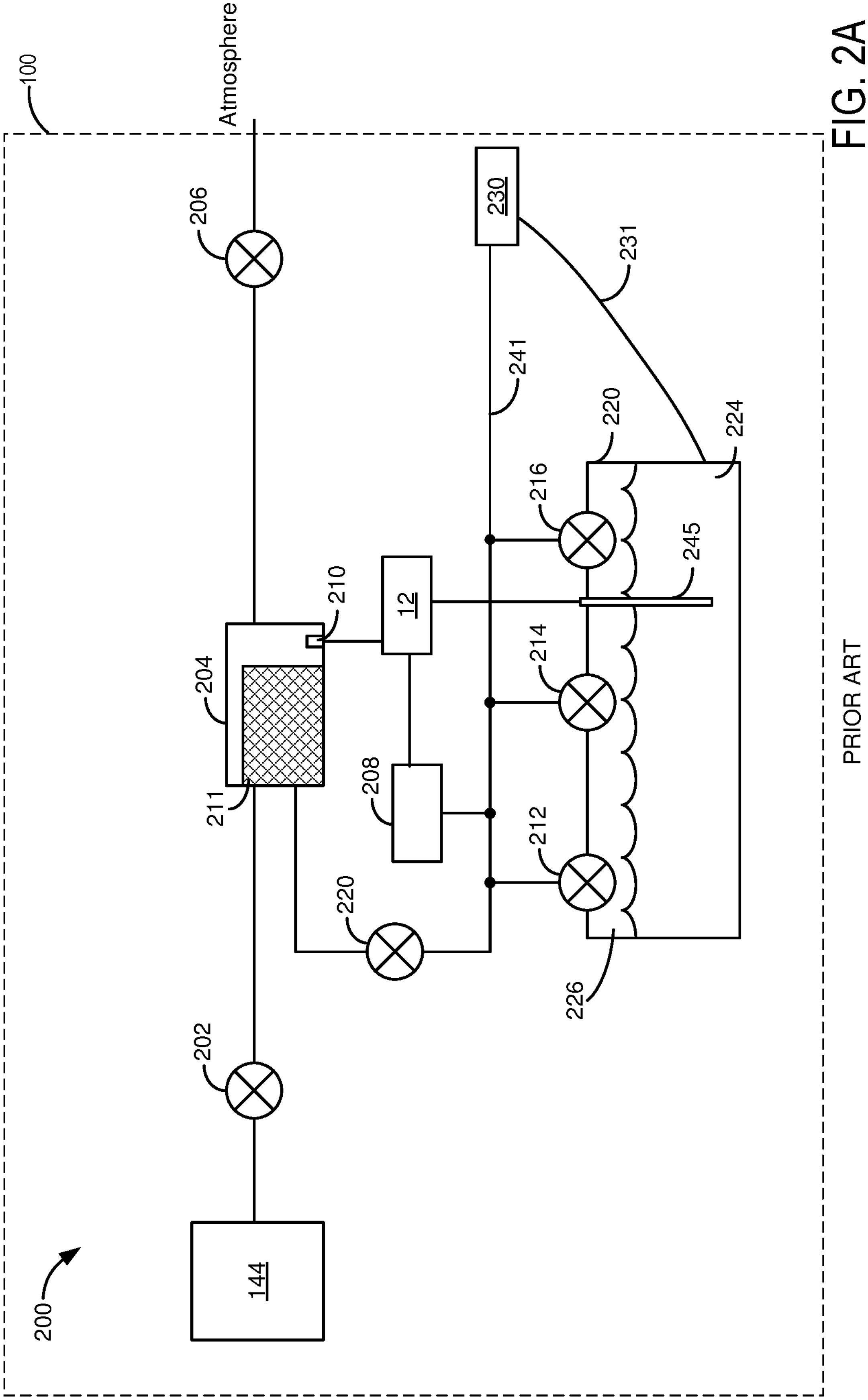
PRIOR ART FIG. 2A
FIG. 2A shows a first evaporative emissions system.
Figure 2B:
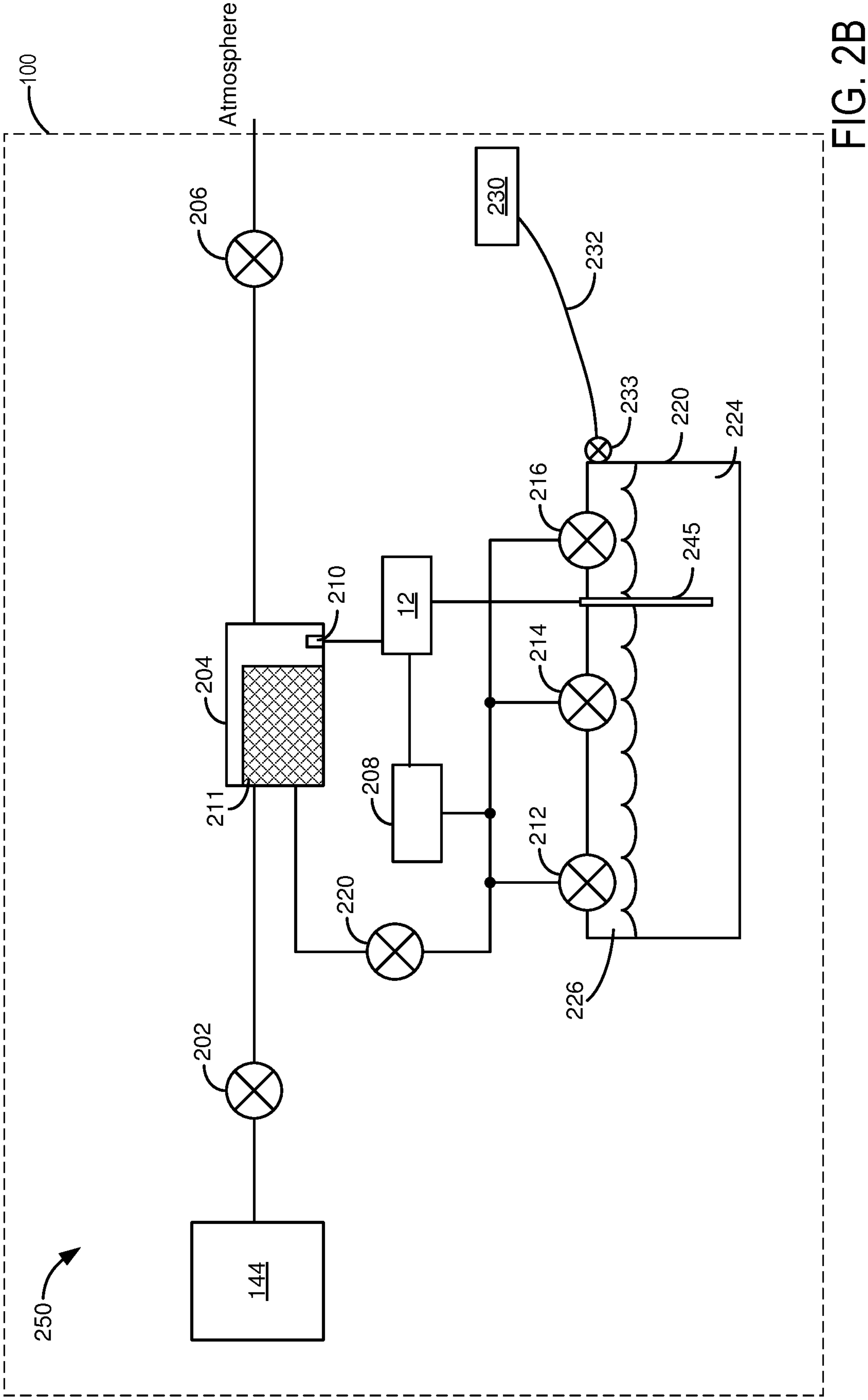
FIG. 2B shows an example evaporative emissions system.

Referring now to FIG. 1, an example vehicle motive power source is shown as part of vehicle 100. In this example, the vehicle motive power source is an internal combustion engine 130 that includes spark ignition. FIG. 1 is schematic diagram showing one cylinder of internal combustion engine 130, which may be a multi-cylinder engine. Internal combustion engine 130 may be controlled at least partially by a control system including a controller 12.

A combustion chamber 132 of the internal combustion engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include a throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 348 downstream of the exhaust gas sensor 127. The device 170 may be a three-way catalyst (TWC), $NO_x$ trap, various other emission control devices, or combinations thereof. In some examples, during operation of the internal combustion engine 130, the emission control device 170 may be periodically reset by operating at least one cylinder of the engine within a particular air-fuel ratio.

The controller 12 is shown in FIG. 1 as a microcomputer, including a microprocessor unit 102, input/output ports 104, an electronic storage medium for executable programs and calibration values shown as read exclusive memory chip 106 (e.g., non-transitory memory) in this particular example, random access memory 108, keep alive memory 110, and a data bus. The controller 12 may receive various signals from sensors coupled to the internal combustion engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from a crankshaft position sensor 118 sensing a position of crankshaft 140; throttle position from a throttle position sensor 165; and manifold pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses each revolution of the crankshaft.

The storage medium read exclusive memory 106 can be programmed with computer readable data representing non-transitory instructions executable by the processor 102 for performing at least portions of the methods described below as well as other variants that are anticipated but not specifically listed. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within internal combustion engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows solely one cylinder of a multi-cylinder engine, and each cylinder may similarly include its own set of intake/exhaust valves, fuel injector, spark plug, etc.

Referring now to FIG. 2A, a block diagram of an example evaporative emissions system 200 is shown. Evaporative emissions system 200 includes a canister purge valve 202, a carbon filled canister 204, a canister vent valve 206, a fuel tank pressure sensor 208, a carbon canister temperature sensor 210, a fuel tank cap 230, a first vent valve 212, a recirculation tube 241, a second vent valve 216, and a fuel constraining vent valve 214. Carbon filled canister 204 may include activated carbon 211 to store fuel vapors. First vent valve 212 and second vent valve 216 may also be described as first grade vent valve 212 and second grade vent valve 216. The first vent valve 212, the fuel constraining valve, and the second vent valve may be fluidically coupled to the carbon containing canister 204 via a conduit 233. Canister vent valve 206 may selectively provide fluidic communication between carbon canister 204 and atmosphere.

Fuel 224 in fuel tank 220 may generate vapors that migrate to vapor space 226 within fuel tank 220 when fuel 224 is exposed to warm temperatures and agitation. Fuel vapors may migrate from vapor space 226 toward atmosphere when either or both of vent valves 212 and 216 are closed. Fuel constraining vent valve 214 may close during filling of fuel tank 220 to prevent overfilling of fuel tank 220. Fuel vapors may be recirculated from vapor space 226 via recirculation tube 241 so that they condense and return to fuel 224. Fuel 224 may flow from fuel cap 230 to fuel tank 220 via fuel filler neck pipe 231. In this example, fuel filler neck pipe 231 supplies fuel to a bottom portion of fuel tank 220. Fuel level sensor 245 may provide an indication of a fuel level in fuel tank 220.

Turning now to FIG. 2B, a block diagram of an example evaporative emissions system 250 according to the present description is shown. Evaporative emissions system 250 includes many of the same components as evaporative emissions system 200. Components of evaporative emissions system 250 that are the same as components of evaporative emissions system 200 are indicated with same numbers. For example, canister purge valve 202 of FIG. 2A is the same canister purge valve 202 shown in FIG. 2B. Therefore, for the sake of brevity, descriptions of components that are equivalent to components shown in FIG. 2A have been omitted.

Evaporative emissions system 250 does not include a recirculation tube because integrated valve assembly 233 includes a first valve (not shown) that permits fuel flow into fuel tank 220 from fuel filler neck pipe 232 and a second valve (not shown) that permits fuel vapor flow from fuel tank 220 into fuel filler neck pipe 232. Fuel filler neck pipe is positioned above a fuel level that represents 85% of when fuel tank 220 is full of fuel. This allows fuel vapors to enter the fuel filler neck pipe 232 so that fuel filler neck pipe 232 may be inspected for breaches. In this example, integrated valve assembly 233 is shown positioned between fuel tank 220 and fuel filler neck pipe 232, but integrated valve assembly 233 may bi-sect fuel filler neck pipe 232 so that integrated valve assembly 233 may be places along fuel filler neck pipe 232.

Figure 3A:
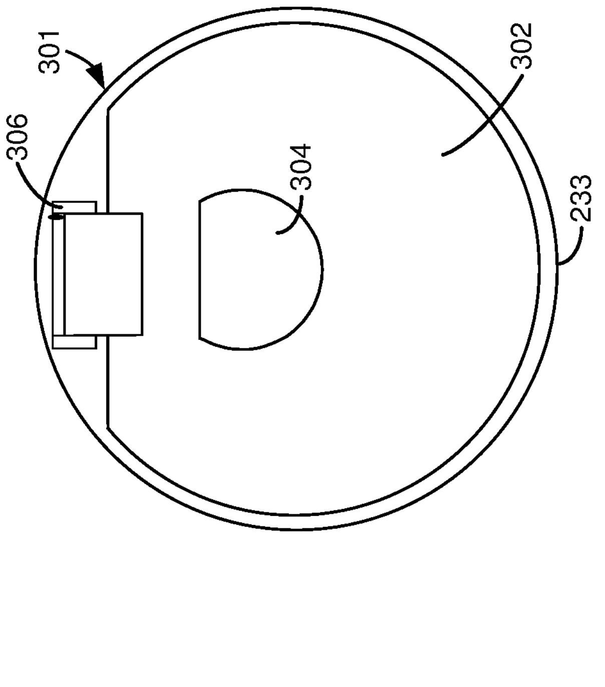
FIGS. 3A-3D shows different views of example fuel filler neck valves.
Figure 3B:
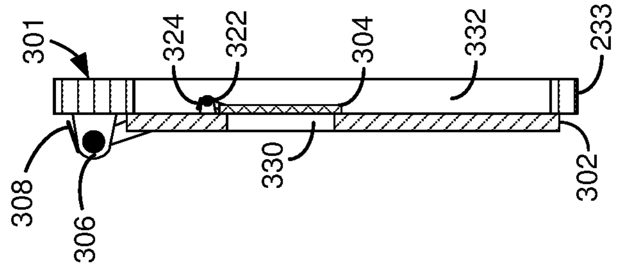
Figure 3C:
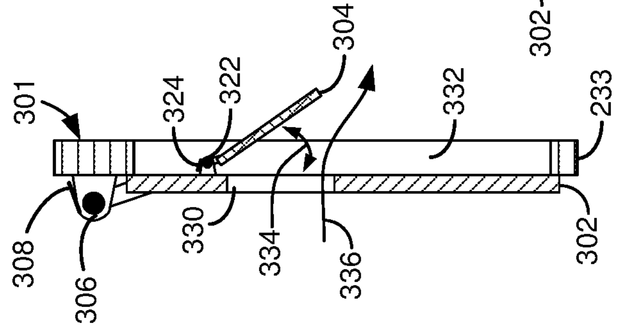
Figure 3D:
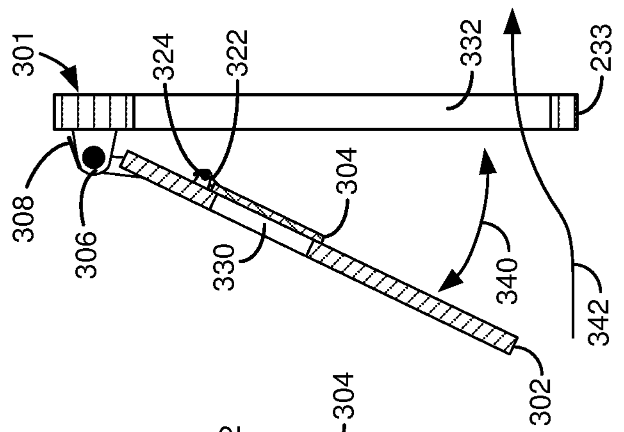

Referring now to FIGS. 3A-3D, schematic diagrams illustrating different views of integrated valve assembly 233 are shown. FIG. 3A shows a plan view of integrated valve assembly 233 and FIGS. 3B-3D show different cross-section views of integrated valve assembly 233.

In this example, integrated valve assembly 233 includes a first valve 302 and a second valve 304. Second valve 304 is fastened to first valve 302 and second valve 304 may move with first valve 302. First valve 302 is coupled to housing or frame 301 via first hinge 306. Frame or housing 301 may be fastened to a fuel tank and/or a fuel filler neck of a fuel tank. First valve 302 and second valve 304 are shown in their closed positions. First valve 302 and second valve 304 prevent or reduce flow of liquid fuel and fuel vapor when they are closed.

In other examples, second valve 304 may be completely separated and not in contact with first valve 302. For example, first valve 302 may close against and be supported by housing or frame 301 and second valve 304 may close against and be supported by housing or frame 301. Further, instead of a single integrated valve assembly, first valve 302 and second valve 304 may be included into two separate assemblies, one for each valve. Thus, it is to be understood that the configuration of integrated valve assembly 233 may differ from the example that is shown in FIG. 3A.

Referring now to FIG. 3B, a cross-section of integrated valve assembly 233 is shown. In this view, first through-hole 332 is visible and first valve 302 is in a closed position so as to constrain fluidic flow through first through-hole 332. Similarly, second through-hole 330 is visible and second valve 304 is in a closed position so as to constrain fluidic flow through second hole 330. First valve 302 is held in its closed position via first hinge 306 and first closing spring 308. Second valve 304 is held in its closed position via second hinge 322 and second closing spring 324.

Moving on to FIG. 3C, a second cross-section of integrated valve assembly 233 is shown. In this view, second valve 304 is shown in a partially open position. The second valve 304 may be in an open or partially open position when pressure in the fuel tank is greater than pressure in the fuel filler neck. Flow of fuel vapors may progress through second valve 304 in the direction that is indicated by arrow 336. Second valve 304 may pivot about second hinge 322 as indicated by arrow 334.

Referring now to FIG. 3D, a third cross-section of integrated valve assembly 233 is shown. In this view, first valve 302 is shown in a partially open position. The first valve 302 may be in an open or partially open position when pressure in the fuel tank is less than pressure in the fuel filler neck. Flow of fuel may progress through first valve 302 in the direction that is indicated by arrow 342. First valve 302 may pivot about first hinge 306 as indicated by arrow 340.

Thus, the system of FIGS. 1-3D provides for a vehicle fuel system, comprising: a fuel tank; a fuel filler neck tube; a first valve positioned between the fuel tank and the fuel filler neck tube or along the fuel filler neck tube, the first valve opening to allow flow into the fuel tank and closing to prevent flow from the fuel tank; and a second valve positioned between the fuel tank and the fuel filler neck tube or along the fuel filler neck tube, the second valve opening to allow flow out of the fuel tank and closing to prevent flow out of the fuel filler neck tube. In a first example, the vehicle system includes where the first valve and the second valve are integrated into an assembly. In a second example that may include the first example, the vehicle system includes where the first valve controls flow through a first through-hole. In a third example that may include one or both of the first and second examples, the vehicle system includes where the second valve controls flow through a second through-hole. In a fourth example that may include one or more of the first through third examples, the vehicle system includes where the fuel filler neck tube enters the fuel tank above a level fuel level where the fuel tank is half full of fuel. In a fifth example that may include one or more of the first through fourth examples, the vehicle system further comprises a carbon filled canister that is in selective fluidic communication with the fuel tank via a vapor blocking valve. In a sixth example that may include one or more of the first through fifth examples, the vehicle system further comprises a canister vent valve in fluidic communication with the carbon filled canister.

Referring now to FIG. 4, an example vehicle operating sequence for according to the method of FIG. 5 for operating an evaporative emissions system of a vehicle is shown. The sequence of FIG. 5 may be provided by the system of FIGS. 1 and 2 in cooperation with the method of FIG. 5. Vertical markers at times t0-t9 represent times of interest during the sequence. All of the plots occur at a same time and under same vehicle operating conditions.

The first plot from the top of FIG. 4 is a plot of fuel tank pressure or vacuum versus time. Positive pressures in the fuel tank are indicated when trace 402 is above the horizontal axis. Pressure in the fuel tank increases in the direction of the vertical axis arrow that is above the horizontal axis. Vacuum in the fuel tank is indicated when trace 402 is below the horizontal axis. Vacuum in the fuel tank increases in the direction of the vertical axis arrow that is below the horizontal axis. The horizontal axis represents time and time increases from the right side of the plot to the left side of the plot. Trace 402 represents pressure and vacuum in the fuel tank.

The second plot from the top of FIG. 4 is a plot of a first fuel filler neck valve (e.g., 302 of FIG. 3A) state versus time. The vertical axis represents the state of the first fuel filler neck valve and the first fuel filler neck valve is open (O) when trace 404 is at a higher level near the vertical axis arrow. The first fuel filler neck valve is closed (C) when trace 404 is at a lower level near the horizontal axis. The horizontal axis represents time and time increases from the left side of the plot to the right side of the plot. Trace 404 represents the first fuel filler neck valve operating state.

The third plot from the top of FIG. 4 is a plot of a second fuel filler neck valve (e.g., 304 of FIG. 3A) state versus time. The vertical axis represents the state of the second fuel filler neck valve and the second fuel filler neck valve is open (O) when trace 406 is at a higher level near the vertical axis arrow. The second fuel filler neck valve is closed (C) when trace 406 is at a lower level near the horizontal axis. The horizontal axis represents time and time increases from the left side of the plot to the right side of the plot. Trace 406 represents the second fuel filler neck valve operating state.

The fourth plot from the top of FIG. 4 is a plot of a canister vent solenoid valve (e.g., 206 of FIG. 2B) state versus time. The vertical axis represents the canister vent solenoid valve and the canister vent solenoid valve is open (O) when trace 408 is at a higher level near the vertical axis arrow. The canister vent solenoid valve is closed (C) when trace 408 is at a lower level near the horizontal axis. The horizontal axis represents time and time increases from the left side of the plot to the right side of the plot. Trace 408 represents the canister vent solenoid valve state.

The fifth plot from the top of FIG. 4 is a plot of a fuel tank refilling state (e.g., an indication of whether or not the fuel tank is being refilled) versus time. The vertical axis represents the fuel tank refilling state and the fuel tank is being refilled when trace 410 is at a higher level near the vertical axis arrow. The fuel tank is not being refilled when trace 410 is at a lower level near the horizontal axis. The horizontal axis represents time and time increases from the left side of the plot to the right side of the plot. Trace 410 represents the fuel tank refilling state.

The sixth plot from the top of FIG. 4 is a plot of a canister purge valve state versus time. The vertical axis represents the canister purge valve state and the canister purge valve state indicates that the canister purge valve is open when trace 412 is at a higher level near the vertical axis arrow. The canister purge valve is not open when trace 412 is at a lower level near the horizontal axis. The horizontal axis represents time and time increases from the left side of the plot to the right side of the plot. Trace 412 represents the canister purge valve state.

The seventh plot from the top of FIG. 4 is a plot of a vapor blocking valve state versus time. The vertical axis represents the vapor blocking valve state and the vapor blocking valve state indicates that the vapor blocking valve is open when trace 414 is at a higher level near the vertical axis arrow. The vapor blocking valve is not open when trace 414 is at a lower level near the horizontal axis. The horizontal axis represents time and time increases from the left side of the plot to the right side of the plot. Trace 414 represents the vapor blocking valve state.

At time t0, pressure in the fuel tank is near atmospheric pressure (the pressure level at the horizontal axis) and the first and second fuel filler neck valves are closed. The canister vent solenoid is open and the fuel vapor blocking valve is open so that fuel vapors may flow to the carbon filled canister (not shown) from the fuel tank. The fuel tank is not being refilled and the canister purge valve is not open.

At time t1, the fuel tank begins to be refilled with fuel and the first fuel filler neck valve opens to allow fuel into the fuel tank. The second fuel filler neck valve is closed because pressure in the fuel filler neck tube is greater than in the fuel tank. The pressure in the fuel tank is slightly above atmosphere and the canister vent solenoid is open to allows fuel vapors from the fuel tank to flow to the carbon filled canister. The canister purge valve remains closed and the vapor blocking valve remains open.

At time t2, the fuel tank filling ceases and the first fuel filler neck tube valve closes. The second fuel filler neck valve remains closed. The pressure in the fuel tank begins to increase since the vapor blocking valve and the canister vent solenoid are closed to seal the evaporative emissions system. The canister purge valve remains closed.

At time t3, the pressure in the fuel tank has reached a level where purging of the fuel vapors from the fuel tank commences by opening the vapor blocking valve and the canister purge valve. The canister vent valve remains closed so that fuel vapors move from the fuel tank to the engine. The fuel tank is not refilling and the first fuel filler neck valve opens shortly after the carbon canister begins to be purged of fuel vapors due to pressure in the fuel tank dropping below pressure in the fuel filler neck tube.

At time t4, pressure in the fuel tank is reduced to near atmospheric pressure, so the canister purge valve is closed and the canister vent solenoid is opened. The first fuel filler neck valve closes as pressure in the fuel tank is near atmospheric pressure. The second fuel filler neck valve remains closed and the fuel tank is not being refilled. The vapor blocking valve remains open to allow fresh air into the fuel tank via the carbon filled canister and the canister vent valve.

Between time t4 and time t5, the vehicle and the engine are stopped such that the engine does not rotate and combust fuel. The vapor blocking valve is opened for a time to let fuel vapors migrate from the fuel tank to the carbon filled canister. The canister vent solenoid is open to allow fuel vapors to flow to the carbon filled canister and the fuel tank pressure is low. The first and second fuel filler neck valves are closed and the fuel tank is not being refilled.

At time t5, the vehicle enters an engine off natural vacuum diagnostic where the vapor holding capacity of the evaporative emission system is assessed. The fuel tank pressure is near atmospheric pressure and the canister vent solenoid is fully closed to trap fuel vapors in the evaporative emissions system. The fuel tank is not being refilled and the canister purge valve is fully closed. The vapor blocking valve is also fully closed.

Between time t5 and time t6, ambient heat begins to cause the liberation of fuel vapors from fuel in the fuel tank, thereby causing pressure within the fuel tank to increase. The second fuel filler neck valve opens when pressure in the fuel tank applies a force to the second fuel filler neck valve that overcomes a force of a closing spring.

At time t6, the canister vent solenoid and the vapor blocking valve are opened to allow fuel vapors in the fuel tank to be stored in the carbon filled canister. The pressure in the fuel tank drops as fuel vapors migrate toward the carbon filled canister. The second fuel filler neck valve is closed before time t6 when pressure between the fuel tank and the fuel filler neck equalizes. The first fuel filler neck valve remains closed and the fuel tank is not being refilled.

At time t7, the canister vent solenoid and the vapor blocking valve are closed to begin the vacuum phase of the engine off natural vacuum sequence. Vacuum begins to build in the fuel tank as ambient air temperature decreases. The first fuel filler neck valve opens shortly after time t7 so that vapor flow may move from the fuel filler neck to the fuel tank. The second fuel filler neck valve remains closed. The canister vent solenoid and the vapor blocking valve remain closed.

At time t8, vacuum is at a higher level and so the vapor blocking valve and the canister vent solenoid are opened to allow air to enter the fuel tank. The vacuum in the fuel tank is lowered as air enters the fuel tank. The fuel tank is not being filled and the canister purge valve remains closed.

In this way, the first and second fuel filler valves may control flow of vapor and fuel into and out of a fuel tank. The first and second fuel filler valves may operate based on closing forces supplied by closing springs and pressure differentials between the fuel tank and the fuel filler neck tube.

Referring now to FIG. 5, an example method 500 for operating an evaporative emission system of a vehicle is shown. At least portions of method 500 may be included in and cooperate with a system as shown in FIGS. 1-3D as executable instructions stored in non-transitory memory. The method of FIGS. 1-3D may cause the controller to actuate the actuators in the real world and receive data and signals from sensors described herein when the method is realized as executable instructions stored in controller memory.

At 502, method 500 judges whether or not the engine is running (e.g., rotating and combusting fuel). If so, the answer is yes and method 500 proceeds to 504. Otherwise, the answer is no and method 500 proceeds to 520.

At 504, method 500 judges whether or not positive pressure is building within the fuel tank. In one example, method 500 judges that positive pressure is building within the fuel tank when pressure within the fuel tank increases over a predetermined amount of time. If method 500 judges that pressure is increasing in the fuel tank, the answer is yes and method 500 proceeds to 506. Otherwise, the answer is no and method 500 proceeds to 520.

At 506, method 500 judges if the pressure in the fuel tank is greater than a threshold pressure (e.g., a predetermined purging pressure). If so, the answer is yes and method 500 proceeds to 508. Otherwise, the answer is no and method 500 proceeds to 510.

At 508, method 500 purges fuel vapor from the fuel tank. The purging of fuel vapors from the fuel tank may be accomplished via opening the canister purge valve and the vapor blocking valve to allow fuel vapors to enter the running engine. Vacuum in the engine intake manifold draws fuel vapors from the fuel tank to the engine. Lowering pressure in the fuel tank allows the first fuel filler pipe valve to open, thereby lowering pressure and fuel vapors in the fuel filler neck. The second fuel filler pipe valve remains closed. Method 500 proceeds to 520.

At 510, method 500 closes the first fuel filler neck valve and opens the second fuel filler neck valve. The pressure in the fuel tank may open the second fuel filler neck tube to lower the pressure difference between the pressure in the fuel filler neck tube and the pressure in the fuel tank. Method 500 proceeds to 520.

At 520, method 500 judges whether or not the fuel tank is being filled. Method 500 may judge that the fuel tank is being refilled when output of a fuel tank level sensor increases. If method 500 judges that the fuel tank is being filled, the answer is yes and method 500 proceed to 522. Otherwise, the answer is no and method 500 proceeds to 524.

At 522, method 500 opens the first fuel filler neck valve and closes the second fuel filler neck valve. The first fuel filler neck valve opens in response to fuel pressure in the fuel filler neck. Method 500 returns to 520.

At 524, method 500 judges whether or not an evaporative emissions system diagnostic is to be performed. In one example, an evaporative emissions system diagnostic may be performed at predetermined time or driving intervals. If method 500 judges that an evaporative emissions system diagnostic is to be performed, the answer is yes and method 500 proceeds to 526. Otherwise, the answer is no and method 500 proceeds to 540.

At 526, method 500 allows pressure in the fuel tank to increase in response to increasing ambient temperature. Increasing a positive pressure in the fuel tank opens the second fuel filler neck valve while the first fuel filler neck valve remains closed. Method 500 may allow pressure in the fuel tank and fuel filler neck tube to increase for a predetermined amount of time. Method 500 proceeds to 528.

At 528, method 500 judges whether or not pressure in the fuel tank is greater than a predetermined pressure. If the pressure in the fuel tank is greater than a threshold pressure in a predetermined amount of time, the answer is yes and method 500 proceeds to 532. Otherwise, the answer is no and method 500 proceeds to 530.

At 530, method 500 indicates that there may be degradation of the evaporative emissions system. In one example, the degradation may be a breach of the fuel tank or fuel filler neck tube. Method 500 may provide the indication of degradation via displaying a message on a human/machine interface or illuminating a light. Method 500 proceeds to exit.

At 532, method 500 allows vacuum in the fuel tank to increase (e.g., pressure in the fuel tank is lowered below atmospheric pressure) in response to decreasing ambient temperature. Increasing vacuum in the fuel tank (e.g., increasing a magnitude of a negative pressure in the fuel tank) opens the first fuel filler neck valve while the second fuel filler neck valve remains closed. Method 500 may allow vacuum in the fuel tank and fuel filler neck tube to increase for a predetermined amount of time. Method 500 proceeds to 534.

At 534, method 500 method 500 judges whether or not vacuum in the fuel tank is greater than a predetermined vacuum. If the vacuum in the fuel tank is greater than a threshold vacuum in a predetermined amount of time, the answer is yes and method 500 proceeds to 535. Otherwise, the answer is no and method 500 proceeds to 536.

At 535, method 500 method 500 indicates that there is no detected degradation of the evaporative emissions system. Method 500 may provide the indication of absence of degradation via displaying a message on a human/machine interface or illuminating a light. Method 500 proceeds to exit.

At 536, method 500 indicates that there may be degradation of the evaporative emissions system. In one example, the degradation may be a breach of the fuel tank or fuel filler neck tube. Method 500 may provide the indication of degradation via displaying a message on a human/machine interface or illuminating a light. Method 500 proceeds to exit.

At 540, method 500 closes the first fuel filler neck valve and closes the second fuel filler neck valve. Method 500 proceeds to exit.

In this way, method 500 may diagnose an evaporative emissions system and reduce back flow of fuel from a fuel filler neck. The diagnostics and back flow may be controlled via two fuel filler neck valves that open in different directions, the first opening toward the fuel tank and the second opening toward a fuel filler cup.

The method of FIG. 5 provides for a method for diagnosing an evaporative emissions system, comprising: opening a first fuel filler neck valve in response to a positive pressure in a fuel tank; and opening a second fuel filler neck valve in response to a negative pressure in the fuel tank. In a first example, the method includes where the first fuel filler neck valve and the second fuel filler neck valve are integrated into an assembly. In a second example that may include the first example, the method includes where the second fuel filler neck valve selectively allows flow through a through-hole in the first fuel filler neck valve. In a third example that may include one or both of the first and second examples, the method includes where the second fuel filler neck valve is fully closed when the first fuel filler neck valve is open. In a fourth example that may include one or more of the first through third examples, the method includes where the first fuel filler neck valve is fully closed when the second fuel filler neck valve is open. In a fifth example that may include one or more of the first through fourth examples, the method further comprises further comprises increasing the positive pressure in the fuel tank via ambient air temperature. In a sixth example that may include one or more of the first through fifth examples, the method further comprises increasing a magnitude of the negative pressure in the fuel tank via ambient air temperature. In a seventh example that may include one or more of the first through sixth examples, the method further comprises further comprises adjusting a position of an evaporative emissions system valve to increase the positive pressure in the fuel tank.

The method of FIG. 5 also provides for a vehicle fuel system, comprising: a fuel filler neck valve assembly comprising a first valve and a second valve, the first valve configured to selectively close a first through-hole, the second valve configured to selectively close a second through-hole, where the second through-hole is part of the first valve. In a first example, the vehicle fuel system includes where the fuel filler neck valve assembly is positioned between a fuel tank and a fuel filler neck tube. In a second example that may include the first example, the vehicle fuel system includes where the fuel filler neck valve assembly is positioned along a fuel filler neck tube. In a third example that may include one or both of the first and second examples, the vehicle fuel system further comprises a first spring configured to close the first valve. In a fourth example that may include one or more of the first through third examples, the vehicle fuel system further comprises a second spring configured to close the second valve.

Turning now to FIG. 6, a table 600 describing fuel filler neck valve operating states is shown. Table 600 includes rows 602-614 and columns 620-624. Column 620 lists vehicle operating states. Column 622 lists first fuel filler neck valve state and column 624 lists second fuel filler neck valve state. The first and second fuel filler neck valves may be incorporated into an assembly as shown in FIGS. 3A-3D.

Table 600 may be read as follows: when the vehicle is refueling, the first and second fuel filler neck valves are indicated at columns 622 and 624, row 606. Thus, when the fuel tank is being refilled, the first fuel filler neck valve opens and the second fuel filler neck valve is closed.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and nonobvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle fuel system, comprising:

a fuel tank;

a fuel filler neck tube;

a first valve positioned between the fuel tank and the fuel filler neck tube or along the fuel filler neck tube, the first valve opening to allow flow into the fuel tank and closing to prevent flow from the fuel tank; and a second valve positioned between the fuel tank and the fuel filler neck tube or along the fuel filler neck tube, the second valve opening to allow flow out of the fuel tank and closing to prevent flow out of the fuel filler neck tube, where the first valve and the second valve open in two different directions, where the first valve opens in a direction substantially opposite a direction of a flow of fuel vapors, and where the second valve opens in a substantially same direction as the flow of fuel vapors.

2. The vehicle fuel system of claim 1, where the first valve and the second valve are integrated into an assembly.

3. The vehicle fuel system of claim 2, where the first valve controls flow through a first through-hole.

4. The vehicle fuel system of claim 3, where the second valve controls flow through a second through-hole, the second through-hole extending through the first valve, and where the first through-hole and the second through-hole differ in size.

5. The vehicle fuel system of claim 1, where the fuel filler neck tube enters the fuel tank above a level fuel level where the fuel tank is half full of fuel.

6. The vehicle fuel system of claim 1, further comprising a carbon filled canister that is in selective fluidic communication with the fuel tank via a vapor blocking valve.

7. The vehicle fuel system of claim 6, further comprising a canister vent valve in fluidic communication with the carbon filled canister.

8. A method for diagnosing an evaporative emissions system, comprising:

opening a first fuel filler neck valve in response to a positive pressure in a fuel tank; and opening a second fuel filler neck valve in response to a negative pressure in the fuel tank, where the first fuel filler neck valve is larger in surface area than the second fuel filler neck valve, and where opening the second fuel filler neck valve allows flow through a through-hole formed into the first fuel filler neck valve.

9. The method of claim 8, where the second fuel filler neck valve is fully closed when the first fuel filler neck valve is open.

10. The method of claim 8, where the first fuel filler neck valve is fully closed when the second fuel filler neck valve is open, and where the first fuel filler neck valve being fully closed when the second fuel filler neck valve is open allows flow through the through-hole formed into the first fuel filler neck valve.

11. The method of claim 8, further comprising increasing the positive pressure in the fuel tank via ambient air temperature.

12. The method of claim 8, further comprising increasing a magnitude of the negative pressure in the fuel tank via ambient air temperature.

13. The method of claim 8, further comprising adjusting a position of an evaporative emissions system valve to increase the positive pressure in the fuel tank.

14. A vehicle fuel system, comprising:

a fuel filler neck valve assembly comprising a first valve and a second valve, the second valve surrounded by the first valve, where the first valve is configured to selectively close a first through-hole, and the second valve is configured to selectively close a second through-hole, where the second through-hole is part of the first valve, the second through-hole formed into the first valve and extending through the first valve, where the first through-hole and the second through-hole differ in size.

15. The vehicle fuel system of claim 14, where the fuel filler neck valve assembly is positioned between a fuel tank and a fuel filler neck tube, and where the first through-hole is larger than the second through-hole.

16. The vehicle fuel system of claim 14, where the fuel filler neck valve assembly is positioned along a fuel filler neck tube.

17. The vehicle fuel system of claim 14, further comprising a first spring configured to close the first valve.

18. The vehicle fuel system of claim 14, further comprising a second spring configured to close the second valve.

19. The vehicle fuel system of claim 1, where the first valve is pivoted about a first hinge to open the first valve and the second valve is pivoted about a second hinge to open the second valve, and where the first hinge and the second hinge are different hinges.

20. The vehicle fuel system of claim 19, where the first hinge is positioned on a frame surrounding both the first valve and the second valve, and where the second hinge is positioned on a face of the first valve.

* * * * *